United States Patent [19]

Yagi et al.

[11] 3,956,185
[45] May 11, 1976

[54] CATALYST FOR EXHAUST GAS PURIFICATION

[75] Inventors: June Yagi; Harutoki Nakamura, both of Takatsuki; Yoshiharu Maezawa, Takarazuka, all of Japan

[73] Assignee: Matsushita Electric Industrial Co., Ltd., Osaka, Japan

[22] Filed: Dec. 26, 1973

[21] Appl. No.: 427,705

[30] Foreign Application Priority Data

Dec. 28, 1972 Japan................................. 48-3378
Dec. 28, 1972 Japan................................. 48-3379
Feb. 5, 1973 Japan................................. 48-14897

[52] U.S. Cl............................. 252/455 R; 252/454;
252/457; 252/459; 252/460; 252/477 R
[51] Int. Cl.²......................................... B01J 29/06
[58] Field of Search................ 252/455 R, 454, 457,
252/459, 460, 477 R; 106/52, 54

[56] References Cited

UNITED STATES PATENTS

| | | | |
|---|---|---|---|
| 3,189,563 | 6/1965 | Hauel................................. | 252/460 |
| 3,691,097 | 9/1972 | Stiles et al.................. | 252/455 R X |
| 3,697,447 | 10/1972 | Bettinardi......................... | 252/458 |
| 3,804,647 | 4/1974 | Elmer et al........................ | 106/54 |

*Primary Examiner*—Paul F. Shaver
*Attorney, Agent, or Firm*—Stevens, Davis, Miller & Mosher

[57] ABSTRACT

A catalyst for exhaust gas purification comprises a carrier consisting of acid- and high temperature-resistant silica fibers, a first silica layer deposited on surfaces of the silica fibers, and a second heat-resistant material layer deposited on surfaces of the first silica layer, and a catalyst of noble metals, metals or metal oxides deposited on surfaces of the carrier.

4 Claims, 1 Drawing Figure

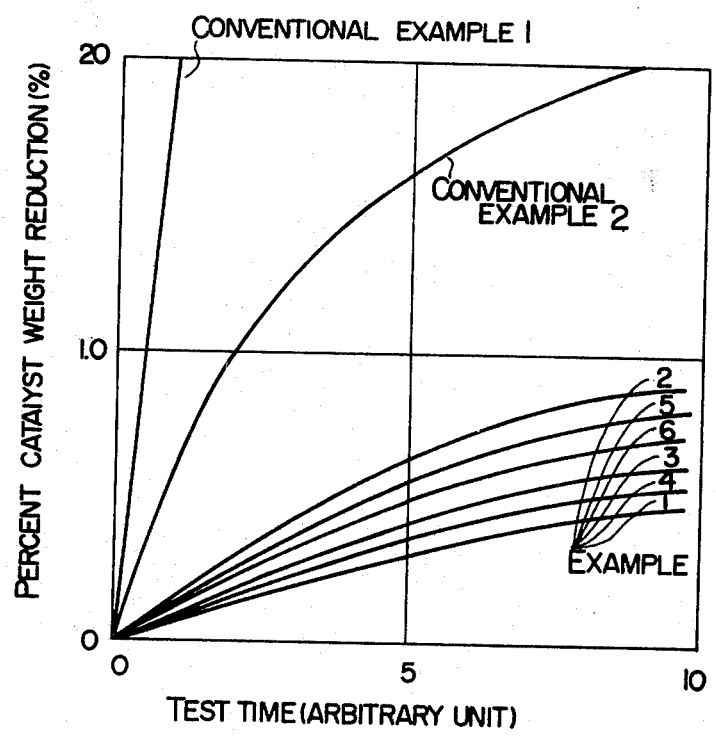

CATALYST FOR EXHAUST GAS PURIFICATION

This invention relates to a novel catalyst for exhaust gas purification and a method for preparing the same.

Heretofore, catalysts of various shapes and compositions, including catalysts for exhaust gas purification, have been proposed, and utilized. Their typical shapes are spherical, columnar and cylindrical, and the materials for carriers of these catalysts are various heat-resistant, high temperature-calcined products, including silica, alumina, etc. as principal materials.

With the developments of catalysts applicable to removal of incomplete combustion products from the automobile exhaust gas or broiler flue gas, new catalysts having new shapes and characteristics, based on new materials, have been proposed and utilized in these fields. They include monolithic catalysts consisting of a single structure or fibrous catalysts based on special heat-resistant fibers.

Since these new catalysts of new shape are mainly directed to exhaust systems of combustion facilities, their development has been concentrated on obtaining much reduction in gas flow resistance through catalyst layers in view of their conversion efficiency. Furthermore, the conversion itself is a high speed, high temperature reaction, and therefore the conventional spherical catalysts are not suitable for such reaction. That is, catalyst spheres or pellets vigorously contact and collide one with another in high speed gas, and undergo serious attrition, resulting not only in deterioration of the catalytic action, but also in discharge of the catalytic materials to the outside of the system, which may bring about new secondary environmental pollution. In this respect, said monolithic catalysts and fibrous catalysts have had a great utility. On the other hand, in the exhaust gas system, the exhaust gas itself is a high temperature gas, and further the heat of reaction is released due to the catalytic reaction. That is, the maximum temperature attainable within the catalyst layer can be expected to reach 1,100° to 1,300°C, and furthermore, the high temperature itself fluctuates vigorously. Also, the exhaust gas flow rate is fluctuated, depending upon the operating or driving conditions of the engine. Consequently, the catalysts repeatedly undergo heat shocks and pressure fluctuation at the same time. A catalyst structure that can withstand breakage even upon the simultaneous application of heat shock and pressure shock has been desired. As a catalyst for exhaust gas purification applicable to said special conditions, a fibrous catalyst having a good heat resistance and flexibility has been regarded as particularly preferable.

However, fibrous materials generally have a very small surface area per filament, owing to their manufacturing process, irrespective of their materials, and therefore it is not better in view of the reaction mechanism of catalyst to use the fibrous materials, as such, as a catalyst substrate or carrier. Therefore, it is better to coat the surfaces of the fibrous materials with some crystalline material to increase their surface area, when the fibrous materials are used as the catalyst substrate or carrier.

The present invention provides a fibrous catalyst based on silica fibers as a substrate, which are popular as the heat-resistant fibers. It has been so far proposed to use the silica fibers as the catalyst substrate or carrier, and examples of coating their surfaces with inorganic crystalline materials to increase their surface area and improve their catalytic characteristics have been already disclosed. However, in the case of their application to the exhaust gas systems of combustion engines, especially those of automobiles, their service conditions are so severe that the coating of inorganic crystalline materials by means of an ordinary organic binder fails to withstand such a high exhaust gas temperature as about 1,000°C, because the binder cannot maintain the binding effect. On the other hand, direct coating onto the surfaces of fibers by immersion, etc. without using the binder has a low retainability towards the surfaces of fibers, and the coating readily peels off owing to the heat shock or vibration.

In view of these situations, the present inventors have studied catalysts, based on glass fibers, whose components other than silica are extracted with a strong acid under heating to increase their silica content. They have found that the dealkalized silica glass fibers of this well-known art are excellent as the catalyst carrier for exhaust gas purification when the dealkalized silica glass fibers are further heated at 700° to 1,000°C for 1 to 10 hours and cooled to room temperature. As a result of further studies of the silica glass fibers thus treated, the present inventors have obtained a catalyst having a higher catalyst retainability, higher heat resistance and higher purification efficiency.

An object of the present invention is to provide a catalyst for exhaust gas purification for use in automobiles, etc. and a method for preparing the same. That is, according to the present invention, a catalyst of high flexibility, very low attrition loss due to external factors, low gas flow resistance through the catalyst layer, low cost and high purification efficiency can be provided. The present catalyst is prepared by heating the dealkalized silica fibers at 700° to 1,000°C for 1 to 10 hours, cooling the silica fibers to room temperature, depositing a first silica coating layer on the surfaces of the silica fibers, depositing a second layer consisting of at least one of heat-resistant porous oxides of alumina, magnesia, zirconia, titania and silica on the surface of the first layer, and then depositing a catalyst component of metals or metal oxides. Heretofore, there have been disclosed several examples of using heat-resistant oxide fibers themselves or those having a layer of this or other materials deposited on their surfaces as a catalyst carrier. However, according to the present invention, the surfaces of the dealkalized silica fibers are exposed to a high temperature, that is, a temperature high enough to cause the surfaces of the silica fibers to undergo sintering, in advance, and then cooled to room temperature, whereby a silica recrystallization layer is formed to a very small depth near the surfaces of the fibers. Then, the surfaces of the recrystallization layer are coated with the same silica material. By dealkalizing glass fibers having properly very smooth surfaces, other components than silica are extracted from the glass fibers, and there remain many tiny pores of the extracted components within or on the surfaces of the dealkalized glass fibers. By heating these surfaces to a temperature high enough to cause sintering and then cooling the surfaces, the surfaces of the glass fibers are covered by a recrystallization layer of molten silica, and thus an amorphous structure and a crystalline structure are present in a mixture at a position very near the surfaces of the fibers. The retainability of the surfaces toward other materials can be more readily and securely improved by roughening the surfaces of the glass fibers considerably and at the same time by partially crystallizing the same, then before the treatment. By coating the thus treated surfaces with the same silica material, chemical bonding of the coating silica with the silica fibers can be readily and firmly carried out, and the silica coating layer can be formed as a firmly integrated extension of the surfaces of the silica fibers. The thus formed silica-coated silica fibers have a much larger surface area than the non-coated silica fibers, and their surfaces are in a porous state. Therefore, any other or the same material can be coated or deposited on the surfaces with ease, and also can be very firmly bound to the surface materials. That is, a far more firm coating or deposition can be effected in the present invention than that conventionally obtained when crystalline materials are coated onto the surfaces of the glass fibers. This fact has been confirmed in heat-resistant fiber materials other than the silica fibers, that is, alumina fibers, zirconia fibers, silicon carbide fibers, carbon fibers by initially forming first layers of alumina, zirconia, etc. on the alumina fibers, zirconia fibers, etc., respectively in a manner similar to those described above, and similar effects to that of the silica coating of the silica fibers can be obtained.

Now, the present invention will be explained in detail by way of examples and a drawing.

The figure graph showing changes in catalyst weight between the present catalyst embodied in Examples 1 – 6 and two of those of the conventional art due to vibration.

EXAMPLE 1

Ordinary glass fibers were dipped in a strong acid such as sulfuric acid, etc. and heated for several hours to extract other components than silica from the glass fibers, and then the resulting dealkalized silica fibers were washed with water, heated at 700° to 1,000°C for 1 to 10 hours, and then cooled to room temperature. Then, the resulting silica fibers were dipped in an acetic acid silica sol containing 20% by weight of silica, picked up, dried in hot air at 100° to 120°C and calcined at 500° to 600°C for several hours, thereby forming a silica layer on the surfaces of the silica fibers. Then, the fibers were dipped again in an aqueous solution containing 10 g of boehmite form alumina sol in 100 cc of deionized water, picked up, dried at 100° to 120°C, and calcined at 550°C, thereby to form an alumina layer on the surface of the silica layer. In the foregoing dipping step, vibration can be applied to the solution to effect uniform distribution onto the surfaces of fibers, or a dilute solution of acetic acid or caustic soda can be added to the solution to keep the pH constant and intensify the adhesion of the deposited materials to the surfaces of the fibers. The viscosity of the dipping solution can be changed, or other additives can be added to the solution, if necessary.

After the completion of the foregoing steps, analysis of the thus obtained carrier revealed that about 30% by weight of silica and 12% by weight of alumina were deposited on the fibers, based on the weight of the carrier. The resulting carrier was then dipped in an alcoholic solution of chloroplatinic acid, picked up, dried, and calcined at 200° to 600°C, whereby silica fiber catalyst containing 0.4% by weight of platinum, based on the weight of the carrier, was obtained.

EXAMPLE 2

A carrier finally having 10% by weight of silica as the first layer and 30% by weight of alumina as the second layer, based on the weight of carrier, was prepared in the same manner as in Example 1, and a catalyst having 0.4% by weight of platinum, based on the weight of carrier, was prepared in the same manner as in Example 1.

EXAMPLE 3

The silica fibers prepared in the same manner as in Example 1 were dipped in an acetic acid silica sol containing 20% by weight of silica, picked up, and dried at 100°C in hot air to deposit gel-like silica onto the surfaces of the silica fibers. Then, the fibers were dipped in an aqueous solution containing 10 g of alumina sol in 100 cc of deionized water, picked up, dried at 100° to 120°C and calcined at 500° to 600°C, thereby to form an alumina layer on the silica layer. The resulting carrier finally had 30% by weight of silica and 10% by weight of alumina, based on the weight of carrier. Then, the carrier was made to possess 0.4% by weight of platinum on its surface by the wet method as described in Example 1, on the basis of the weight of carrier, whereby silica fiber catalyst carrying platinum as a catalyst component was obtained.

EXAMPLE 4

A carrier having 10% by weight of silica and 30% by weight of alumina, based on the weight of carrier, was prepared in the same manner as in Example 3, and the resulting carrier was made to possess 0.4% by weight of platinum as a catalyst component on its surface by the wet method as described in Example 1, on the basis of the weight of carrier, whereby silica fiber catalyst carrying platinum as a catalyst component was obtained.

EXAMPLE 5

The silica fibers prepared in the same manner as in Example 1 were dipped in an acetic acid silica sol solution containing 20% by weight of silica, picked up, and dried in hot air at 100° to 120°C to deposit gel-like silica onto the surfaces of silica fibers. Then, the fibers were dipped in a hydrochloric acid solution of zirconium tetrachloride, heated at 500°C to deposit a zirconium oxide (zircon) layer onto the silica layer by decomposition. The resulting carrier was dipped in an aqueous solution of chloroplatinic acid, and a silica-zircon catalyst carrying platinum as a catalyst component was prepared in the same manner as in Example 1. The thus prepared catalyst finally had 10% by weight of silica, 30% by weight of zircon and 0.5% by weight of platinum, based on the weight of carrier.

EXAMPLE 6

The gel-like silica-coated silica fibers prepared in the same manner as in Example 4 were dipped in an aqueous magnesium nitrate solution, picked up, and calcined at 550°C for 2 hours, thereby to deposit a magnesia layer onto the surface of the silica layer. The resulting carrier was dipped in an aqueous solution of chloroplatinic acid, and reduced at 200°C in a hydrogen gas stream, whereby a silica-magnesia silica fiber catalyst carrying platinum as a catalyst component was prepared. The thus prepared catalyst finally had 15% by weight of silica, 20% by weight of magnesia and 0.4% by weight of platinum, based on the weight of carrier.

For comparison, the following two conventional catalysts were prepared according to the prior art. That is, a spherical alumina carrier coated with γ-alumina on its surfaces was dipped in an aqueous solution of chloroplatinic acid, picked up and heat treated, whereby a spherical alumina catalyst carrying 0.4% by weight of platinum, based on the weight of carrier, was obtained; non-heat treated silica fibers was subjected to direct surface coating with γ-alumina, whereby a fibrous catalyst carrying 0.4% by weight of platinum, based on the weight of carrier, was obtained.

The test results of initial characteristics and heat resistance of the six catalysts of Examples 1 to 6, and two conventional catalysts are given in the Table, together with values of the specific surface area.

The activity test procedure was such that a nitrogen balance gas containing 5.0% CO and 1000 ppm $n\text{-}C_6H_{14}$ was mixed with ½ volume of dry air, and the resulting gas mixture was passed over the catalyst in a reaction furnace at a space velocity of $4 \times 10^4$ $hr^{-1}$ to effect catalytic reaction. As to the heat resistance test, the catalysts were heated in air at 850°C for 48 hours, and then subjected to said activity test. All values other than the value of the specific surface area in the Table are directed to those of the CO component in the gas mixture containing the hydrocarbon, and the maximum space velocity is a maximum value of space velocity at which the CO component is 100% convertible, that is, maximum treating capacity.

As is evident from the Table, the present catalysts are superior to the conventional two catalysts in their initial characteristics as well as the characteristic after the heat resistance test, especially in maximum space velocity. For example, ratios of the initial values to the values after the heat resistance test, that is, the precent reduction, are 50 to 60% in the conventional catalyst, whereas those of the present catalysts remain about 30%. Furthermore, the results of measurement of specific surface area according to the BET method reveal that there is a distinguished difference in the ratio of the initial values to those after the heat resistance test between the conventional fibrous catalyst and the present catalysts.

the two conventional catalysts were subjected to a beating test to give strict vibrations and impacts to the catalysts to bring the catalysts under attrition by force. The results are given in the FIGURE, where the catalysts of Examples 1 - 6, prepared by heat treating the silica fibers, initially depositing the silica layer onto the fibers, and then depositing the second layer thereon have considerably better results than the conventional catalysts.

According to the present invention, the glass fibers can be prepared into a net-like fabric or woven fabric before the dealkalization treatment, and then the fabric can be dealkalized, whereby they can have an equivalent effect to those of Examples 1 - 6 as silica cloth. Suitable net structure of the fabrics can be properly determined, whereby an optimum value of the exhaust gas flow resistance can be selected as an integrated catalyst when it is mounted on the exhaust gas systems of automobiles. Particularly, the most preferable shape can be selected as the catalyst for the purification of exhaust gas from the automobile.

Now, further examples will be given below:

EXAMPLE 7

Glass fibers of long filaments usually having sizes of 5 to 15 μ were bundled and prepared in yarns having sizes of 0.1 to 0.5 mm. The yarns were woven into a net-like fabric, with 5 yarns as warps per cm and 8 yarns as wefts per cm and entagling the wraps and wefts with one another so as not to cause any dislocation. Then the fabric was dealkalized in the same manner as in Example 1, and subjected to deposition of silica as the first layer, then alumina as the second layer, and 0.4% by weight of platinum as catalyst component, based on the weight of carrier to prepare a net-like platinum-bearing silica catalyst fabric. The catalyst fabric had 12% by weight of silica and 25% by weight of alumina, based on the weight of the silica fabric as the carrier.

In addition to the fabric of the structure as shown in Example 7, other fabrics of other structure and different net sizes were studied by the present inventors, and it was found that these fabrics had equivalent effects to Table

| Catalyst | Initial activity test | | | | Activity test after heat resistance test | | | |
|---|---|---|---|---|---|---|---|---|
| | Activation start temp. (°C) | Complete oxidation temp. (°C) | Maximum space velocity hrs$^{-1}$ | Specific surface area m²/gr | Activation start temp. (°C) | Complete oxidation temp. (°C) | Maximum space velocity hrs$^{-1}$ | Specific surface area m²/gr |
| Example 1 | 180 | 245 | 25 × 10⁴ | 120 | 280 | 380 | 18 × 10⁴ | 50 |
| Example 2 | 178 | 245 | 28 × 10⁴ | 100 | 265 | 350 | 20 × 10⁴ | 72 |
| Example 3 | 185 | 250 | 25 × 10⁴ | 110 | 275 | 375 | 18 × 10⁴ | 70 |
| Example 4 | 180 | 260 | 25 × 10⁴ | 90 | 290 | 380 | 17 × 10⁴ | 65 |
| Example 5 | 188 | 250 | 25 × 10⁴ | 100 | 295 | 370 | 18 × 10⁴ | 70 |
| Example 6 | 185 | 265 | 24 × 10⁴ | 113 | 290 | 385 | 19 × 10⁴ | 55 |
| Conventional catalyst 1 | 180 | 410 | 18 × 10⁴ | 250 | 310 | 450 | 5 × 10⁴ | 90 |
| Conventional catalyst 2 | 200 | 290 | 20 × 10⁴ | 60 | 280 | 390 | 10 × 10⁴ | 25 |

In addition to said activity characteristics, attrition resistance and scattering prevention of the catalyst due to vibration, or thermal shock or pressure fluctuation during the service time are required for the catalyst for the purification of exhaust gas from automobiles, etc. at the same time. The catalysts of Examples 1 - 6 and that of Example 7. When the present fabric catalysts were mounted in the exhaust gas systems of actual automobiles and tested, it was found that the power loss of the automobile engines was least and CO and hydrocarbon purifications were most satisfactory in the case of the net fabrics having a thickness of 0.5 to 2.0 mm, prepared by weaving 3 to 20 warps and 3 to 20 wefts per cm.

In the foregoing examples, the catalysts having platinum as a catalyst component are given, but the catalysts having any of palladium, ruthenium, rhodium, osmium, iridium, and rhenium as a catalyst component on the present carrier can have an equivalent effect. Furthermore, the catalyst having any of nickel, copper, chromium, vanadium, iron, cobalt, manganese, lead, tin, zinc, magnesium, molybdenum, silver and their oxides as a catalyst component, other than said noble metals, can have an equivalent effect. Several examples of these catalysts will be given below:

EXAMPLE 8

The same net-like fabric carrier as in Example 7, which finally had the first silica layer and second alumina layer on the carrier surface, was prepared in the same manner as in Example 7, and dipped in an aqueous hydrochloric acid solution containing palladium chloride in an amount corresponding to 0.5% by weight of palladium to be deposited onto the carrier, picked up, dried in hot air at 100° to 150°C, heated at 600°C for 1 hour, and reduced in a hydrogen atmosphere at 300°C, whereby a palladium-bearing silica fabric catalyst having 0.5% by weight of palladium was prepared.

EXAMPLE 9

The same net-like fabric carrier as in Example 7, which finally had 5% by weight of the first silica layer, and 8% by weight of the second alumina layer on the carrier surface, was prepared in the same manner as in Example 7, and dipped in an aqueous cobalt salt solution consisting of 60 parts by weight of cobalt nitrate and 40 parts by weight of deionized water, picked up, dried in hot air at 100° to 150°C for 2 hours, and calcined at 400°C for 3 hours under forced ventilation, whereby a cobalt oxide-bearing silica fabric catalyst was prepared. The catalyst had 20% by weight of cobalt oxide, based on the weight of carrier.

EXAMPLE 10

The same net-like fabric as in Example 7, which finally had the first silica layer and the second alumina layer, was prepared in the same manner as in Example 7, dipped in an aqueous rhodium chloride solution, picked up, dried and reduced at 400°C with hydrogen, whereby the rhodium-bearing silica fabric catlayst finally having 0.5% by weight of rhodium, based on the weight of carrier, was prepared.

EXAMPLE 11

The same net-like carrier as in Example 7, which finally had the first silica layer and the second alumina layer on the carrier surface, prepared in the same manner as in Example 7, was dipped in an aqueous ruthenium chloride solution, picked up, dried, and reduced at 400°C with hydrogen, whereby a ruthenium-bearing silica fabric catalyst finally having 0.4% by weight of ruthenium was prepared.

EXAMPLE 12

The same net-like carrier as in Example 7, which finally had the first silica layer and the second alumina layer on the carrier surface, prepared in the same manner as in Example 7, was dipped in an aqueous solution containing chloroplatinic acid and iridium chloride, dried, dipped in a 2N ammonia water containing ammonium hexachloroosmate (IV), picked up, dried, and reduced at 200°C in a hydrogen gas stream until no more hydrogen chloride was formed, whereby a silica fabric catalyst finally having 0.05% by weight of platinum, 0.07% by weight of iridium and 0.3% by weight of osmium, based on the weight of the carrier, was prepared.

EXAMPLE 13

Silica fabric catalysts finally having the first silica layer and the second alumina layer, and 0.05 to 1.0% by weight of platinum, and 0.05 to 1.0% by weight of palladium, deposited on the carriers were prepared from the same carrier as in Example 7 and the corresponding metal salts in the same manner as in Example 7 through dipping, drying and calcination.

EXAMPLE 14

Silica fabric catalysts finally having the first silica layer and the second alumina layer, and 0.5 to 1.0% by weight of palladium and 0.01 to 1.0% by weight of at least one of ruthenium, rhodium, rhenium, osmium and rhodium, deposited on the carrier, were prepared from the same carrier as in Example 7, and the corresponding metal salts in the same manner as in Example 7 through dipping, drying and calcination.

At least two of metals or metal oxides enumerated in the foregoing examples can be used together as the catalytic components of the present catalyst, and such catalysts have an equivalent catalytic effect.

Gas flow resistances of the net-like silica fabric catalysts of Examples 7 to 14 and the conventional spherical catalysts were compared by passing a gas mixture consisting of a $N_2$ balance gas containing 5% CO and a dry air through the catalysts at a space velocity of $5 \times 10^4$ hr$^{-1}$. The gas flow resistances of the net-like fabric catalysts of the present invention were small by 1/8–1/15 than that of the conventional spherical catalysts, and had a conversion higher by 20 – 40% than that of the conventional spherical catalysts at a catalyst bed temperature of 300°C. In the determination of the conversion, the spherical catalysts used had same content of catalyst components as those of the present net-like fabric catalysts.

In the foregoing examples, the silica fibers or silica fabrics have not more than 40% by weight of the first silica layer, the second layer of alumina or other materials, and the catalytic metals or metal oxides in total, based on the weight of the silica fibers or fabrics. As a result of studies on the content of these materials, it has been found that, if the silica fibers or fabrics have more than 40% by weight of these materials, based on the weight of silica fibers or fabrics, the flexibility of the silica fibers or fabrics is lost, and their resistance to mechanical shock is lowered. That is, the fibers or fabrics are readily broken. Furthermore, their resistance to a high temperature heat shock is decreased.

The present catalysts have the following effects:

i. In contrast to the conventional fibrous catalysts, the inorganic crystalline materials of the present catalysts have a very good retainability, and no attrition loss appears almost at all.

ii. Higher heat resistance, and good flexibility against external forces such as vibration, pressure fluctuation, heat shocks, etc., owing to its special dealkalized, heat-treated fibrous structure.

iii. Less gas flow resistance owing to a net-like structure.

iv. Good versatility in mode of application as a catalytic means, and higher catalytic conversion. Consequently, the exhaust gas can be treated at a high flow rate per unit weight of the catalyst.

v. Any well-known commercially available materials can be used, and consequently the catalysts can be prepared at a relatively low cost.

vi. The process for preparing the catalyst is simple, and continuous production is possible.

The present catalysts and process have the advantages as shown above, and can be very effectively utilized in industries as a means for preventing environmental pollution.

What is claimed is:

1. A catalyst for exhaust gas purification, which comprises glass fibers having a silica content of 96 to 100% by weight, said fibers having been dealkalized by extraction with sulfuric acid and heated at 700° to 1,000°C for 1 to 10 hours; a first silica layer deposited on the surfaces of the glass fibers; a second layer consisting of at least one of the group consisting of alumina, titania, zirconia, magnesia and silica deposited on the surfaces of the first layer; and at least one metal selected from the group consisting of platinum, palladium, rhenium, ruthenium, rhodium, osmium, iridium, nickel, copper, chromium, vanadium, iron, cobalt, manganese, lead, tin, zinc, magnesium, molybenum, silver and their oxides deposited on the surfaces of the second layer as a catalyst component.

2. A catalyst according to claim 1, wherein the first silica layer is 0.5 to 20% by weight, the second layer is 1.0 to 30% by weight, and the total of the first layer and the second layer is 1.5 to 40% by weight, based on the weight of the glass fibers.

3. A catalyst according to claim 1, wherein the silica fibers are in a fabric state.

4. A catalyst according to claim 3, wherein the fabric is woven by 3 to 20 warps and 3 to 20 wefts per cm and has a thickness of 0.5 to 2 mm.

* * * * *